United States Patent
Schafer et al.

(10) Patent No.: US 10,387,757 B2
(45) Date of Patent: Aug. 20, 2019

(54) MULTICORE PRINTER DEFINITION LANGUAGE PROCESSING

(71) Applicant: KYOCERA Document Solutions Inc., Osaka (JP)

(72) Inventors: Stephen L. Schafer, El Segundo, CA (US); Jayant Bhatt, Torrance, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/704,369

(22) Filed: Sep. 14, 2017

(65) Prior Publication Data
US 2018/0005092 A1    Jan. 4, 2018

Related U.S. Application Data

(62) Division of application No. 14/674,368, filed on Mar. 31, 2015, now Pat. No. 9,792,537.

(51) Int. Cl.
    *G06K 15/00*   (2006.01)
    *G06K 15/02*   (2006.01)

(52) U.S. Cl.
    CPC ....... *G06K 15/181* (2013.01); *G06K 15/1857* (2013.01); *G06K 15/408* (2013.01)

(58) Field of Classification Search
    USPC ....................................................... 358/1.14
    See application file for complete search history.

(56) References Cited

U.S. PATENT DOCUMENTS

| 4,715,044 | A |  | 12/1987 | Gartner |
| 5,752,036 | A |  | 5/1998 | Nakamura et al. |
| 2004/0036908 | A1 | * | 2/2004 | Yagita ............... G06F 3/121  358/1.15 |
| 2005/0200880 | A1 |  | 9/2005 | Oshiumi et al. |
| 2008/0263071 | A1 |  | 10/2008 | Ferlitsch et al. |
| 2011/0043855 | A1 | * | 2/2011 | Ono .................. G06F 3/1215  358/1.15 |

* cited by examiner

*Primary Examiner* — Henok Shiferaw
*Assistant Examiner* — Darryl V Dottin
(74) *Attorney, Agent, or Firm* — McDonnell Boehnen Hulbert & Berghoff LLP

(57) ABSTRACT

The disclosure is directed towards a system and method for using a multicore processor to process a printer definition language (PDL). The system improves efficiency by supporting parallel processing of many commonly used PDLs, while also supporting serial processing of many legacy PDLs. When processing a PDL, the system relies on several stages, including a parsing stage, a printer drawings services stage, and a graphic services stage, which includes order generation. The system provides flexibility by permitting function calls of common PDLs to be either asynchronous requests or blocking synchronous requests. Because legacy PDLs are executed serially, legacy PDL requests are considered to be blocking synchronous requests. The system provides a level of abstraction at the PDL level by allowing multiple requests to be combined into a compound asynchronous request. The system also improves accuracy by notifying the original caller of a request about an error during error handling.

7 Claims, 13 Drawing Sheets

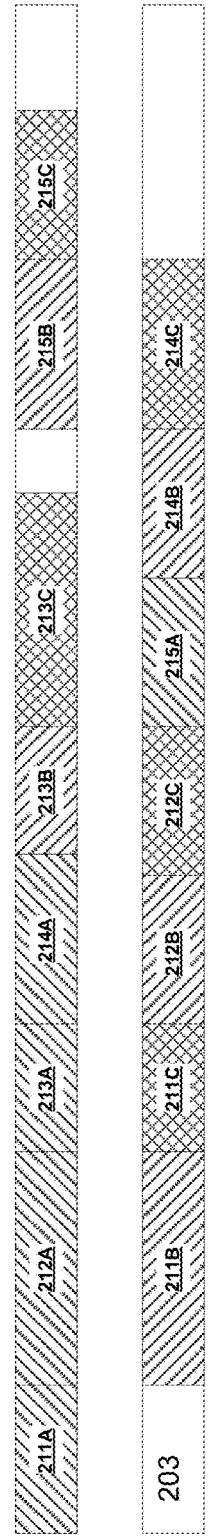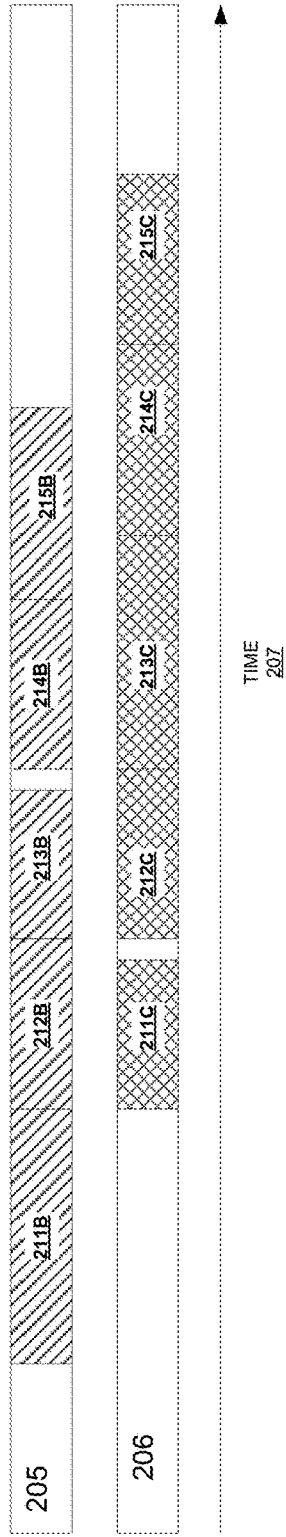

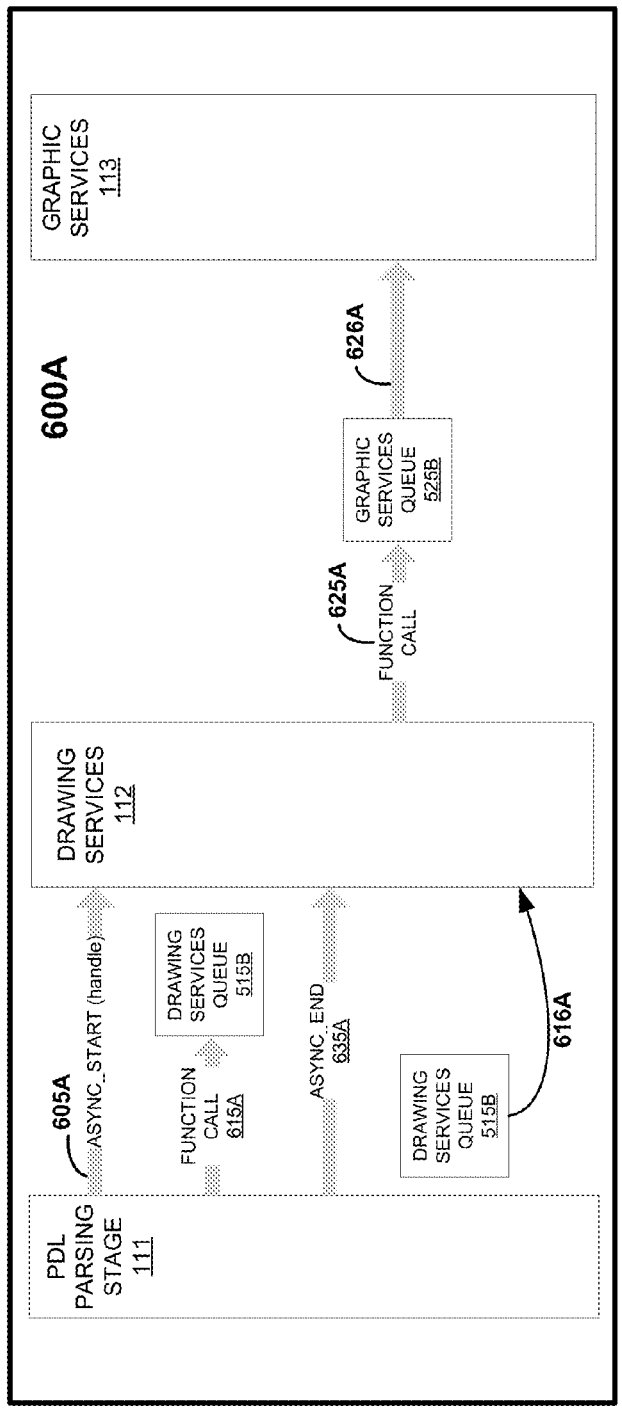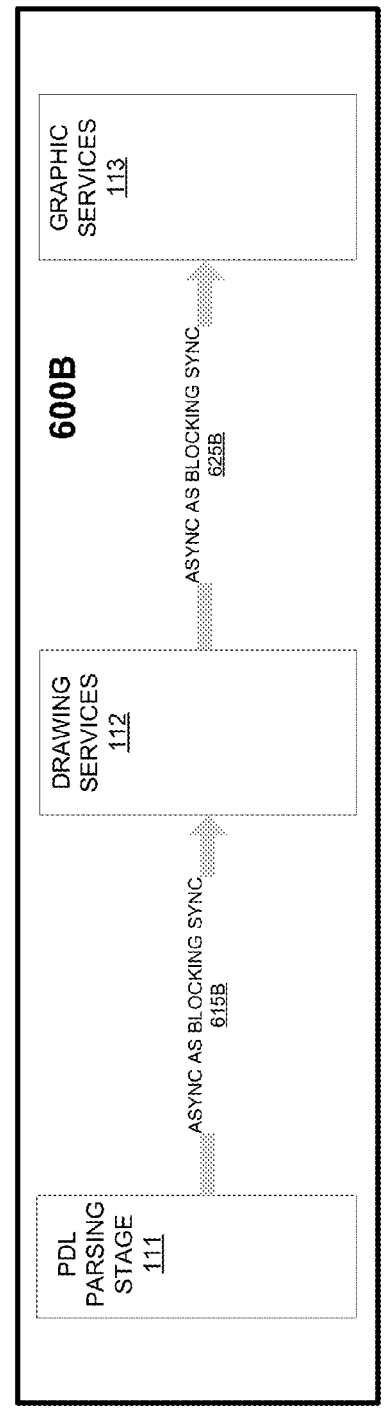

MULTICORE PRINTER DEFINITION LANGUAGE PROCESSING

CROSS-REFERENCE TO RELATED APPLICATION

The present application claims the benefit of U.S. patent application Ser. No. 14/674,368, filed Mar. 31, 2015, the content of which is herewith incorporated by reference.

BACKGROUND

In recent years, demand has risen for increased performance and computing power of computing devices, including computers, desktops, laptops, servers, printers, scanners, copiers, fax machines, multi-function printing devices, and/or other computing devices. The demand for improved computing power has led to the development of various techniques for enhancing processor performance. One technique includes implementing multicore processors within various computing devices. A multicore processor can execute tasks in parallel by using each core of the processor to execute a separate task. As a result, the parallel execution of tasks by a multicore processor improves processor performance, and in turn, computing performance of associated computing devices.

SUMMARY

In a first aspect, a method includes processing a first portion of a printer definition language (PDL) during a first PDL processing stage; generating one or more requests from the first portion of the PDL for a second PDL processing stage; processing the one or more requests from the first portion of the PDL for the second PDL processing stage during the second PDL processing stage; and processing a second portion of the PDL during the first PDL processing stage when the first PDL processing stage is available.

In a second aspect, a method includes processing a first portion of a printer definition language (PDL) during a first PDL processing stage; generating a function call for a function of the first portion of the PDL for a second PDL processing stage; determining whether the function call is an asynchronous or blocking synchronous function call, wherein the function call is configured to be either an asynchronous or blocking synchronous function call; processing the function call for the function of the first portion of the PDL during the second PDL processing stage; and processing a second portion of the PDL during the first PDL processing stage when the first PDL processing stage is available.

In a third aspect, a method includes processing a first portion of a printer definition language (PDL) during a first PDL processing stage; generating one or more requests from an operation of the first portion of the PDL for a second PDL processing stage, wherein the one or more requests include a first request and a second request; and combining the first request and second request into a compound request of the operation of the first portion of the PDL for the second PDL processing stage.

These, as well as other aspects, alternatives, and advantages, will become apparent to those of ordinary skill in the art by reading the following detailed description, with reference where appropriate to the accompanying drawings.

BRIEF DESCRIPTION OF THE DRAWINGS

FIGS. 2A-2C illustrate example block diagrams of PDL processing stages implemented on various types of processors.

FIGS. 6A-6C illustrate example block diagrams of PDL function based parallel processing.

DETAILED DESCRIPTION

In the following detailed description, reference is made to the accompanying figures, which form a part hereof. It should be understood, however, that the arrangements described herein are set forth as examples only. As such, those skilled in the art will appreciate that other arrangements and elements (e.g., machines, interfaces, functions, orders of functions, etc.) can be used instead or in addition. Further, many of the elements described herein are functional entities that may be implemented as discrete or distributed components or in conjunction with other components, and in any suitable combination and location. Various functions described herein as being performed by one or more entities may be carried out by hardware, firmware or software logic. For instance, various functions described herein may be carried out by a processor executing instructions written in any suitable programming language and stored in memory.

In this description, the articles "a" or "an" are used to introduce elements of the example embodiments. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements.

I. Overview

Multicore processors have improved performance and computing power of computing devices by using the multiple processor cores to execute multiple tasks in parallel. Printing devices can also be improved by using multicore processors to execute tasks during printing. In particular, printer definition language (PDL) processing can be improved by using multicore processors to execute PDL processing tasks in parallel for certain PDLs.

Figure 1A:
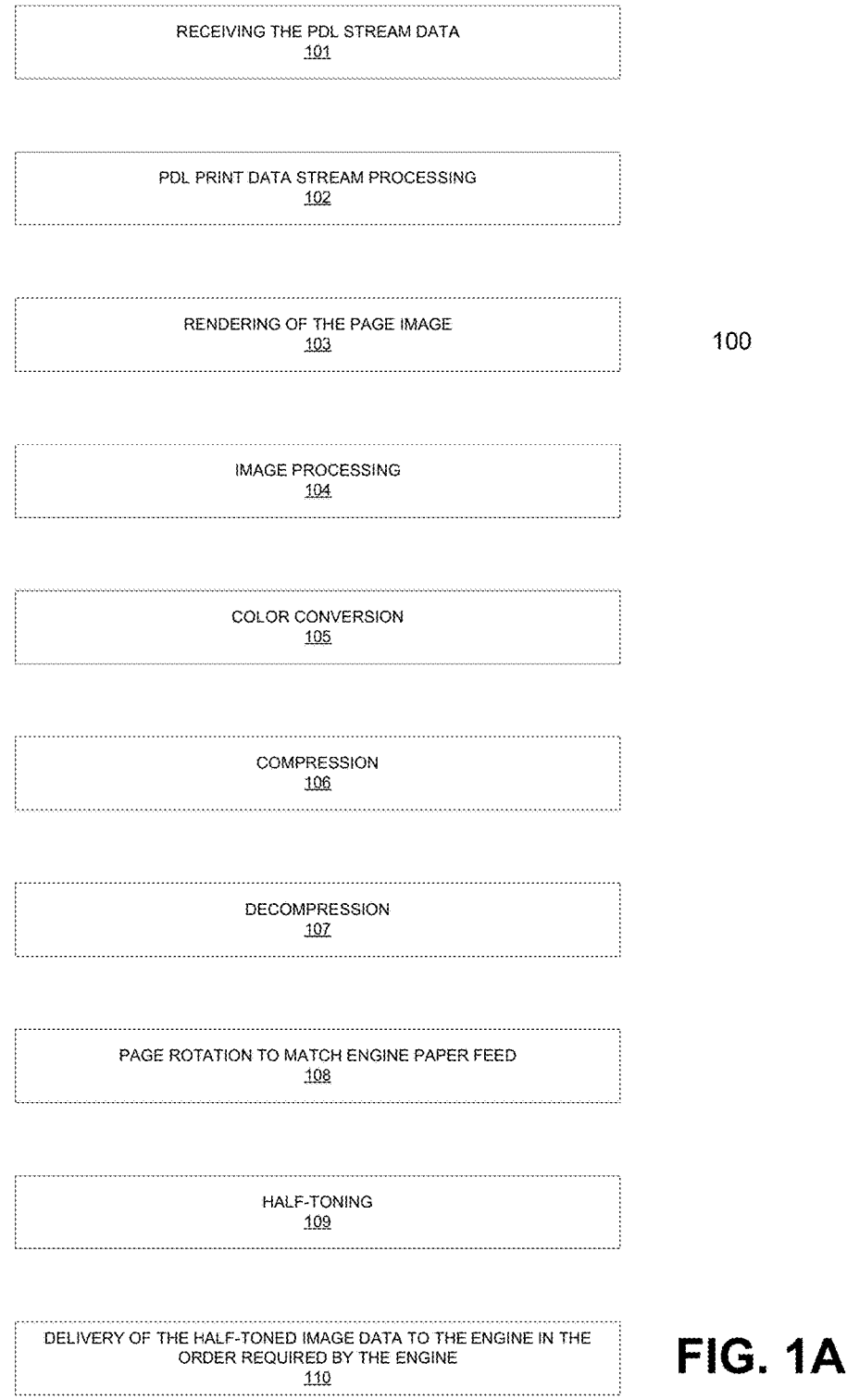
FIG. 1A illustrates an example block diagram of the stages of a printing process.

The printing process may include many printer processing stages that use a central processing unit (CPU), application specific integrated circuit (ASIC), or a digital signal processor (DSP) component controlled by the CPU for a printing device. These printer processing stages, as shown in FIG. 1A, include receiving the PDL stream data 101, PDL print data stream processing 102, rendering the page of the image 103, image processing 104, color conversion 105, compression 106, decompression 107, page rotation to match engine paper feed 108, half-toning 109, and delivery of the half-toned image to the engine in the order required by the engine 110. Depending on the hardware and architecture of the printing device, the stages and the order of the stages of FIG. 1A may vary.

A page can be divided into a number of bands to limit the amount of memory required by the hardware of the printing device, such as a processor. Many of the printer processing stages displayed in FIG. 1A operate on one band at a time. Any number of threads may be used to execute or manage the printer processing stages. The disclosed systems and methods are directed towards the PDL print data stream processing stage 102.

A printing device first receives the PDL stream data during printer processing stage 101. After receiving the PDL data, the printing device processes the received PDL print data stream during printer processing stage 102. A PDL is a language that describes the appearance of the printed page. Many PDLs can specify how a page should be marked or drawn, including PCLXL, PostScript, PCL5, PDF, XPS, SVG, etc.

A PDL print data stream is a serial sequence of commands that can establish a marking state, modify a marking state, or specify an object to be drawn at a location on one or more pages. The marking state is the net result of all prior commands that may be required for drawing (i.e., cumulative). A drawing command can mark pixels already marked by a prior drawing command. The result of the drawing command for each pixel may depend on the result of previous drawing commands for the same pixel. The drawing commands may be ordered in sequence. The drawing commands may be unordered with respect to the page location.

A PDL may include one or more operations that contribute to the marking state specified by the PDL. Examples of operations may include "text," "fill," "stroke," "image," and other operations. The operations may include one or more functions to execute the operation. During PDL print data stream processing stage 102, the PDL may generate one or more requests that may be associated with a particular operation and/or a particular function. The generated requests are discussed in further detail in FIGS. 4-7.

Figure 1B:
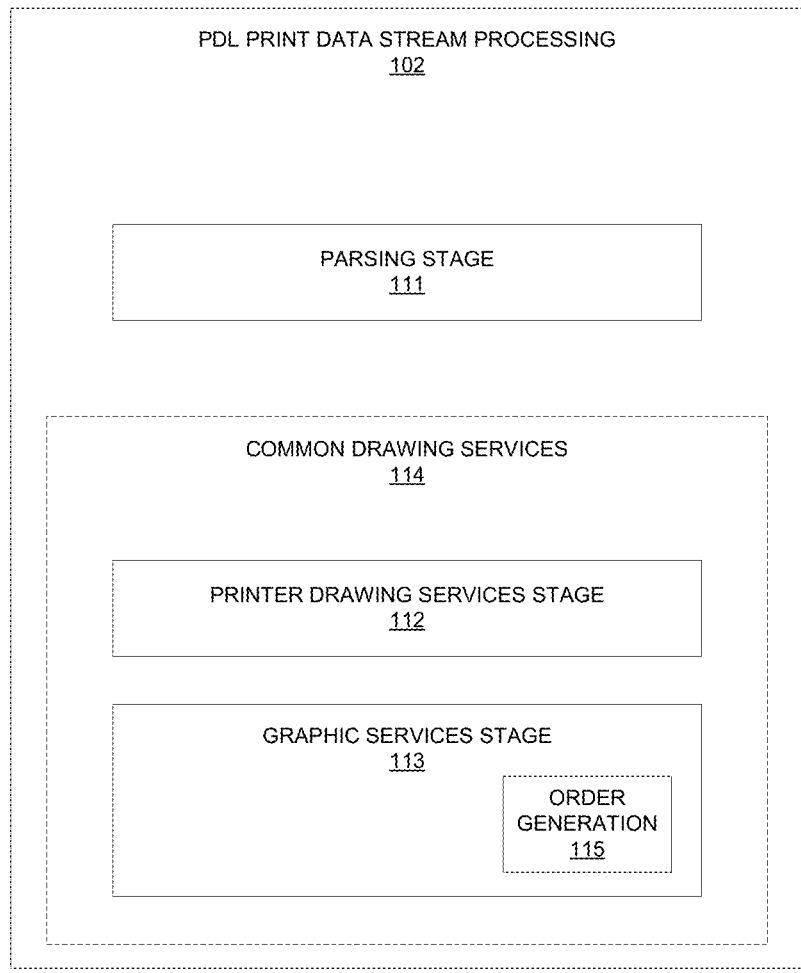
FIG. 1B illustrates an example block diagram of the stages for printer definition language (PDL) print data stream processing.

The PDL print data stream processing stage 102 can be split into multiple PDL processing stages, as shown in FIG. 1B. In particular, FIG. 1B shows that stage 102 includes multiple PDL processing stages, including a PDL parsing stage 111, a printer drawing services stage 112, and a graphic services stage 113. Stages 112 and 113 are part of common drawing services 114. Stage 113 includes order generation 115. In some embodiments, stage 102 may include more, fewer, and/or different PDL processing stages than those displayed in FIG. 1B.

The purpose of parsing stage 111 is to identify the marking state and the drawing commands of the PDL. Parallel processing of the PDL can be challenging due to variance in the received PDL print data stream. As a result, during the parsing stage 111, various steps may be taken by the system to implement parallel processing of PDLs on a multicore processor.

For example, certain PDLs may have their serial sequence of commands modified to take advantage of parallel processing provided by a multicore processor. In particular, during the parsing stage, one or more requests for other PDL processing stages may be generated. During stage 111, the requests may be determined to behave synchronously or asynchronously. Asynchronous requests may then be added to PDL processing stage queues to promote parallel execution of PDL processing.

During stage 111, the PDL modifications required for supporting parallel processing of PDLs with multicore processors may cause the lifetime of various resources, variables, and states associated with the PDL to vary. As a result, during stage 111, and possibly other stages, the system may also keep track of and update the lifetime of various resources, variables and states.

Additionally, during stage 111, the system may determine how the system responds to an error during PDL processing. For example, during stage 111, the system may determine an appropriate response to a PDL processing error. The response may be displaying the error on a user interface, flushing page data, continuing operation, and/or some other response to the PDL processing error. The system may execute more, less, and/or different tasks than those described during stage 111.

Common drawing services stage 114 keeps the current drawing state and generates objects and commands to mark the page. Common drawing services 114 may include multiple stages, such as printer drawing services stage 112 and graphic services stage 113. Printer drawing services stage 112 may convert a drawing object to an intermediate form. The intermediate form may include a trapezoid list, rectangles, or a scanline table (which may be used for other polygons). Graphic services stage 113 may then use the intermediate forms to generate orders for the page. In some embodiments, common drawing services 114 may include more, fewer, and/or different services than the services described.

Graphic services stage 113 includes order generation 115. Order generation 115 may build order lists for each band that is marked and store band related objects if they are needed. The order lists may then be sent to a print engine for the printing device. In some embodiments, processing stage 102 includes more, less, and/or different PDL processing stages than those displayed in FIG. 1B.

Although many other threads may execute during printing, the PDL print data stream processing stage 102 may use the most CPU cycles during printing processing. As a result, the processing time for stage 102 may be the main determinant of printer device performance. Thus, parallel processing of a PDL using multicore processors may reap large rewards for printer device performance.

The performance of a printing device with a multicore processor can be enhanced by using as many of the CPU cycles as are available on all of the processor cores. One method for implementing PDL processing on multiple cores is to generate queues between each PDL processing stage and generate additional threads to process the entries for each queue. By generating queues and additional threads for PDL processing, performance of a printing device during the printing process can be improved due to parallel execution of the threads on a multicore processor.

FIGS. 2A, 2B, and 2C display the improvements in PDL processing time realized by using multicore processors. FIG. 2A displays PDL processing on a processor with a single core 201. FIG. 2B shows PDL processing on a processor with two cores 202 and 203. FIG. 2C shows PDL processing on a multicore processor featuring three cores 204, 205, and 206. As the processor adds more cores, the processing time 207 may be reduced. In particular, FIG. 2B shows that a processor with two cores requires less PDL processing time 207 than the processor with one core shown in FIG. 2A. Additionally, FIG. 2C shows that the processor with three cores requires less PDL processing time 207 than the processor with two cores in FIG. 2B and the processor with one core in FIG. 2A.

In FIGS. 2A-2C, a PDL is split into five portions, 211, 212, 213, 214, and 215, for processing. When a portion of the PDL is processed, the particular PDL portion enters a first stage "A," followed by a second stage "B," followed by a third stage "C." Thus, a new thread is introduced to process a particular PDL portion during a particular PDL processing stage (e.g., 211A, 212B, 213C, etc.) for the multicore processors shown in FIGS. 2B and 2C.

Shaded regions indicate times 207 where a processor core is busy executing a PDL processing stage for a particular PDL portion. Unshaded regions indicate times 207 where a processor core is idle because the processor core is not executing PDL processing stages for any PDL portions. Each PDL processing stage (e.g., "A," "B," and "C") is displayed with a corresponding shading pattern. A particular PDL portion for a particular stage may be processed by a particular core once the particular core is no longer busy.

For example, in FIG. 2C, PDL processing of 215C by core 206 is delayed from the completion of PDL processing of 215B because core 206 is busy. Specifically, core 206 must complete PDL processing of 214C before beginning PDL processing of 215C. Once core 206 completes PDL processing of 214C, core 206 is no longer busy, and can begin PDL processing of 215C.

Additionally, only one PDL portion can use a particular PDL processing stage at any particular time. Thus, a PDL portion cannot use a processing stage (e.g., stage B) while another PDL portion is currently using the same processing stage (e.g., stage B). Shaded regions also indicate times 207 where a PDL processing stage is unavailable. If none of the cores of the processor display a shaded region for a particular PDL processing stage, then the particular PDL processing stages are available for processing a PDL portion.

For example, in FIG. 2C, PDL processing of 215C is delayed from the completion of PDL processing of 215B because of PDL processing of 214C by core 206. Specifically, PDL processing stage "C" is unavailable after completion of PDL processing of 215B because core 206 is completing PDL processing of 214C. Once core 206 completes PDL processing of 214C, PDL processing stage "C" is available, which allows core 206 to begin PDL processing of 215C.

Furthermore, a particular PDL portion (e.g., 211) may enter a stage (e.g., "B" or "C") after the preceding PDL processing stages for the particular PDL portion have been completed. For example, PDL processing of 211B begins when PDL processing of 211A is complete. Additionally, PDL processing of 211C begins when PDL processing of both 211A and 211B are complete. For this reason, in FIG. 2C, PDL processing of 214B by core 205 is slightly delayed from the end of PDL processing of 213B. Specifically, because PDL processing of 214A by core 204 finishes slightly later than PDL processing of 213B by core 205, PDL processing of 214B begins slightly later than the end of PDL processing of 213B by core 205.

Also, parallel processing of a PDL may be for one or more active PDLs. In the embodiments displayed in FIGS. 1A-1B, 2B-4, and 5B-11, the system supports parallel PDL processing for one active PDL at a time. In other words, PDL processing of a second PDL can only begin once PDL processing of the first PDL has finished. As a result, the system cannot process two active PDLs in parallel. For example, in FIG. 2C, PDL portions 211-215 are portions of a first PDL. PDL processing of a second PDL cannot begin until all portions of the first PDL (including portions 211-15) have completed PDL processing (i.e., PDL print data stream processing stage 102). However, in other embodiments, a system (e.g., a printing device) may allow for multiple PDLs to be active and processed in parallel.

As each processor adds more cores, the processing time of a PDL portion during a particular stage is increased relative to the processing time of the same PDL portion for the same stage in a processor with fewer cores. Thus, 211A in FIG. 2B requires more processing time 207 than 211A in FIG. 2A. Similarly, 211A in FIG. 2C requires more processing time 207 than 211A in FIG. 2B.

FIGS. 2B and 2C show that a multicore processor can process multiple portions of a PDL at the same time. For example, in FIGS. 2B and 2C, PDL portions 212 and 211 are processed during the same time 207. In particular, PDL processing stage "B" is executed for PDL portion 211 (see 211B) by cores 203 and 205 at the same time 207 that PDL processing stage "A" is executed for PDL portion 212 (see 212A) by cores 202 and 204. In some embodiments, PDL portion 212 is a subsequent PDL portion of PDL portion 211. By executing PDL processing stages for multiple PDL portions concurrently, a printing device with a multicore processor may have enhanced PDL processing performance.

FIGS. 2A-2C also display how a multicore processor can improve performance of a variable serial process. A variable serial process, as shown in FIG. 2A, includes PDL processing stages that last for different amounts of time. For example, in FIG. 2A, the PDL stages for PDL portion 211, as shown by 211A, 211B, and 211C, last for different amounts of time 207. Because the serial process of processing a PDL is not uniform, the disclosed system and method can be used to improve performance. In particular, queues can be used to help implement the disclosed system and method (see FIGS. 5-8). The disclosed system and method could be applied for a uniform serial process (e.g., PDL processing where the processing stages each last for a similar amount of time). However, performance for a uniform serial process may be improved without implementing queues.

While the disclosed system and method is discussed in the context of PDL processing, the disclosed system and method could be applied to other variable serial processes that can be improved by using multicore processors. These processes could include processing tasks for copying, scanning, printing, faxing, or other applications of a printing device or multi-function printing device. Further, the variable serial processes could include other applications for other computing devices.

Thus, FIGS. 2A-2C demonstrate that processors with additional cores may reduce PDL processing time by allowing more threads to execute in parallel. In other embodiments, the savings realized by a printing device during PDL processing may be more or less than the time savings displayed in FIGS. 2A-2C. Additionally, while FIGS. 2A-2C only display processors with one, two, or three cores, a processor with more than three cores may be possible. Further, a processor with more than three cores may provide greater performance improvement and lower processing times than those displayed in FIGS. 2A-2C.

II. Example Computing Device Components for a Printing Device

Figure 3:
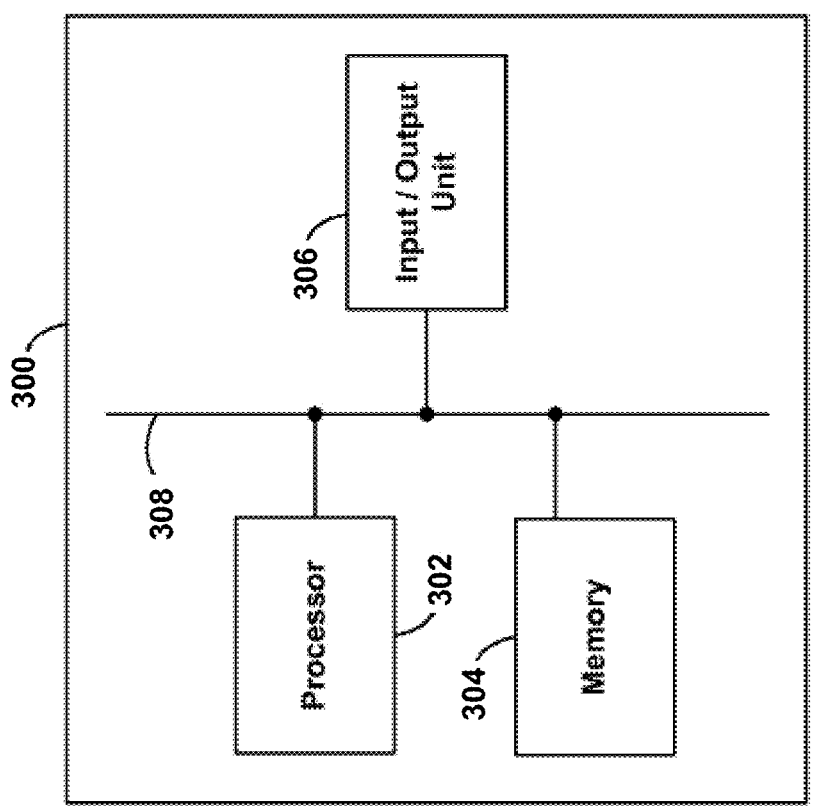
FIG. 3 illustrates an example block diagram of a computing device.

FIG. 3 depicts an example embodiment 300 of computing device components (e.g., functional elements of a computing device) that may be included in a printing device. The printing device may be a multi-function printing device capable of printing, scanning, copying, faxing, and/or other device functions. The device could be a different computing device capable of other functions.

Computing device components 300 may include a processor 302, memory 304, and input/output unit 306, all of which may be coupled by a system bus 308 or a similar mechanism. Processor 302 may include one or more central processing units (CPUs), such as one or more general purpose processors and/or one or more dedicated processors (e.g., application specific integrated circuits (ASICs) or digital signal processors (DSPs), etc.).

Memory 304, in turn, may comprise volatile and/or nonvolatile data storage and can be integrated in whole or in part with processor 302. Memory 304 may store program instructions, executable by processor 302, and data that are manipulated by these instructions to carry out the various methods, processes, or functions described herein. Alternatively, these methods, processes, or operations can be defined by hardware, firmware, and/or any combination of hardware, firmware and software. Therefore, memory 304 may include a tangible, nontransitory computer-readable medium, having stored thereon program instructions that, upon execution by one or more processors, cause the printing device to carry out any of the methods, processes, or functions disclosed in this specification or the accompanying drawings.

Input/output unit 306 may serve to configure and/or control the operation of processor 302 for one or more of the printer processing stages and PDL processing stages described in FIGS. 1A and 1B. Input/output unit 306 may also provide output based on the operations performed by processor 302.

These examples of a printing device are provided for illustrative purposes. In addition to and/or alternatively to the examples above, other combinations and/or sub combinations of printer and computer technologies may also exist, amongst other possibilities, without departing from the scope of the embodiments herein.

III. Multicore PDL Processing

Figure 4:
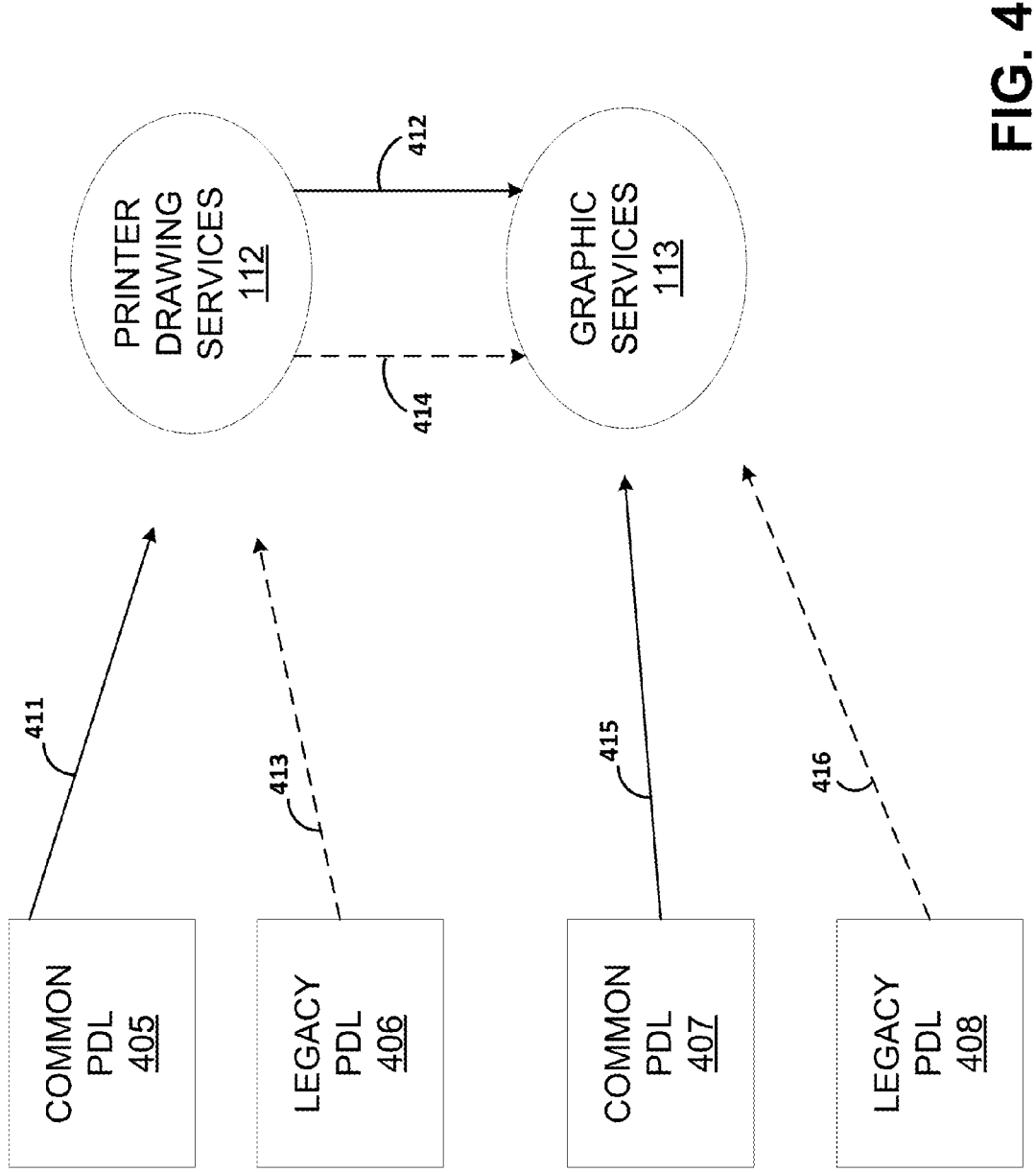
FIG. 4 illustrates an example block diagram of processing requests from different PDLs.

FIG. 4 displays a configuration 400 for a system (e.g., a printing device) using a multicore processor for PDL processing. A printing device can contain various PDLs that can be configured to work synchronously or asynchronously within the same environment. Multiple PDLs can coexist together working synchronously or asynchronously and still rely on common services. As a result, commonly used PDLs have improved performance by using parallel processing, while legacy PDLs can still operate synchronously with little or no impact on quality or performance.

In the displayed embodiment of FIG. 4, the system includes common PDLs 405 and 407, legacy PDLs 406 and 408, printer drawing services stage 112, graphic services stage 113, asynchronous requests 411, 412, and 415, and synchronous requests 413, 414, and 416. In other embodiments, the configuration 400 may contain more, fewer, and/or different PDLs, asynchronous requests, synchronous requests, and services than those displayed in FIG. 4. Additionally, the configuration 400 may contain other components not displayed in FIG. 4.

FIG. 4 shows that the system may process either a legacy PDL or a common PDL. PDL processing of a legacy PDL, such as legacy PDLs 406 and 408, is executed serially. Specifically, legacy PDLs are incapable of parallel execution during PDL processing. Because legacy PDLs are executed serially, the parsing stage 111 for a legacy PDL generates one or more synchronous requests for subsequent PDL processing stages.

In contrast, common PDLs, such as PDLs 405 and 407, are capable of parallel execution during PDL processing. During parsing stage 111, the system recognizes whether or not the PDL is a common PDL or a legacy PDL. The system implements parallel processing of common PDLs on a multicore processor by generating asynchronous requests for a common PDL and one or more queues for one or more PDL processing stages. In particular, during the parsing stage 111 for a common PDL, the system generates one or more asynchronous requests for a subsequent PDL processing stage. The one or more generated asynchronous requests may be added to a queue for the subsequent PDL processing stage and removed from the queue once the subsequent PDL processing stage is available. By breaking a PDL into portions, multiple portions of a common PDL can be processed in parallel during different stages, as shown in FIGS. 2B and 2C.

FIG. 4 displays one or more synchronous requests 413, 414, and 416 and asynchronous requests 411, 412, and 415. During the parsing stage 111, the system determines whether the requests generated for the parsed PDL should be synchronous or asynchronous requests. Synchronous requests for an operation block a process until the operation completes. In contrast, asynchronous requests for an operation merely initiate the operation. In the meantime, a process can proceed and be notified by some other mechanism when the operation is completed. As a result, asynchronous requests can be queued and executed in parallel with other requests, whereas synchronous requests cannot be queued and are executed serially until completion of the operation.

FIG. 4 displays printer drawing services 112 and graphic services 113. In one embodiment, services 112 and 113 may be a part of the common drawing services 114. In some embodiments, printer drawing services stage 112 and graphic services stage 113 may each have one or more queues associated with the particular services. Each queue may be used to store one or more asynchronous requests from a PDL.

In FIG. 4, common PDL 405 is parsed during parsing stage 111 and generates one or more asynchronous requests 411 for printer drawing services stage 112. The one or more asynchronous requests 411 may be added to a queue for printer drawing services stage 112. The requests 411 may be removed from the queue for processing during stage 112. PDL processing of the requests 411 during stage 112 may cause one or more asynchronous requests 412 for graphic services stage 113 to be created. Processing of the requests 412 during graphic services stage 113 may cause additional requests to be generated for subsequent PDL processing stages for PDL 405.

For common PDL 407, the parsing stage 111 generates one or more asynchronous requests 415 for graphic services stage 113. In this embodiment, no asynchronous requests of PDL 407 are generated for printer drawing services stage 112. Processing of the requests 415 during graphic services stage 113 for PDL 407 may cause additional requests to be generated for subsequent PDL processing stages for PDL 407.

For legacy PDL 406, the parsing stage 111 generates one or more synchronous requests 413 for printer drawing services stage 112. During processing of the requests 413 during stage 112, one or more synchronous requests 414 for stage 113 may be generated for PDL 406. Processing the requests 414 during graphic services stage 113 may cause additional requests to be generated for subsequent PDL processing stages for PDL 406.

For legacy PDL 408, parsing stage 111 generates one or more synchronous requests 416 for graphic services stage 113. No synchronous requests of PDL 408 are generated for printer drawing services stage 112. Processing of the requests 416 during stage 113 for PDL 408 may cause additional requests to be generated for subsequent PDL processing stages for PDL 408.

In one embodiment of FIG. 4, common PDL 405 may rely on one or more asynchronous requests 411 for printer drawing services stage 112 and one or more synchronous requests 414 for graphic services stage 113. In this embodiment, common PDL 405 is parsed during parsing stage 111 and generates one or more asynchronous requests 411 for printer drawing services stage 112. The requests 411 may be added to a queue for stage 112 and removed from the queue for processing during stage 112. PDL processing of the requests 411 during stage 112 may then cause one or more synchronous requests 414 to be created for stage 113. Processing the requests 414 during stage 113 may cause additional requests to be generated for subsequent PDL processing stages for common PDL 405. Two threads may be used to implement this embodiment of FIG. 4.

Figure 5A:
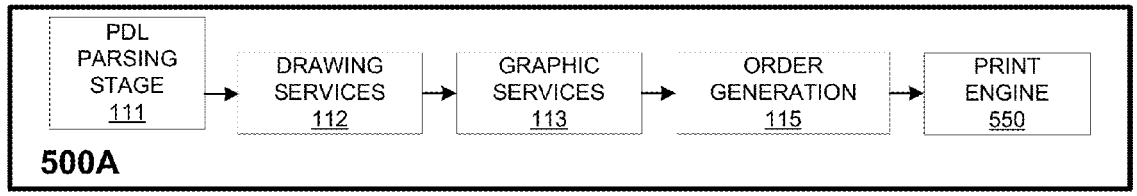
FIGS. 5A-5D illustrate example block diagrams of data flow for the PDL processing stages.

FIGS. 5A-5D display in detail how data may flow for different PDLs. FIG. 5A displays an existing synchronous data flow that may be implemented on a single core processor. In FIG. 5A, a PDL may be parsed during parsing stage 111 to generate synchronous requests for subsequent PDL processing stages. PDL processing then continues to drawing services stage 112, followed by graphic services stage 113, followed by order generation 115, and finally print engine 550. Because the PDL in FIG. 5A is processed serially, the PDL processing stages 112, 113, 115, and 550 for synchronous requests for an operation of the PDL are completed prior to processing of requests for another operation. In some embodiments, order generation 115 of FIGS. 5A-5D is part of the graphic services stage 113, as shown in FIG. 1B.

Figure 5B:
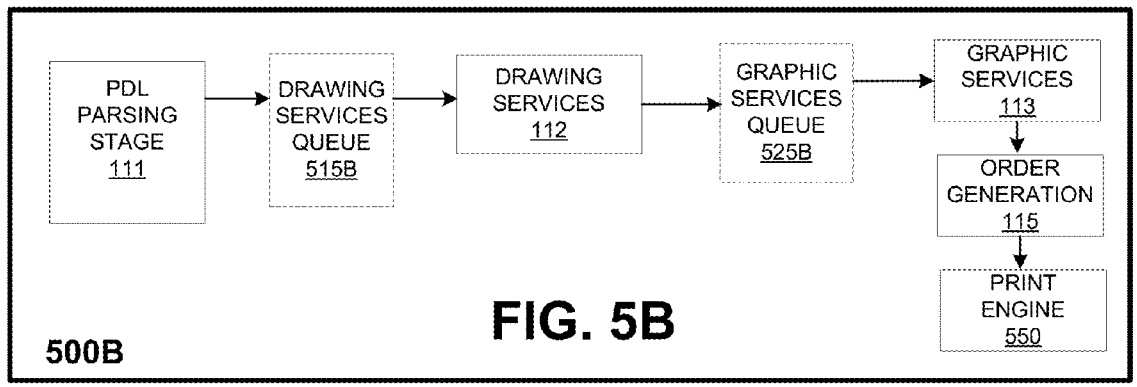

FIG. 5B displays the data flow 500B for a common PDL, such as PDL 405 with asynchronous requests for a multicore processor. During the parsing stage 111, one or more asynchronous requests are generated for the common PDL 405. The asynchronous requests are added to drawing services queue 515B. When the drawing services stage 112 is available, the requests are removed from drawing services queue 515B for processing at stage 112. During PDL processing of the requests for drawing services 112, one or more requests may be generated for graphic services 113. As a result, the graphic services requests may be added to graphic services queue 525B. Once graphic services stage 113 is available, the requests from queue 525B may then be removed for PDL processing during stage 113. In FIG. 5B, PDL processing then proceeds to order generation 115. Once PDL processing at stage 115 is complete, the order lists generated during order generation 115 are sent to print engine 550.

The queues generated in FIG. 5B, such as queues 515B and 525B, may be dedicated to a particular stage. In some embodiments, each queue that is generated is dedicated to a particular stage. In other embodiments, more than one queue may be generated for a particular stage. Alternatively, a queue may be dedicated to multiple PDL processing stages. In the displayed embodiment, stage 112 has a dedicated queue 515B while stage 113 has a dedicated queue 525B. In the displayed embodiment, queues 515B and 525B may be any applicable size or depth and contain any number of entries. The stage queues, such as 515B and 525B, help enable parallel processing of a PDL.

Figure 5C:
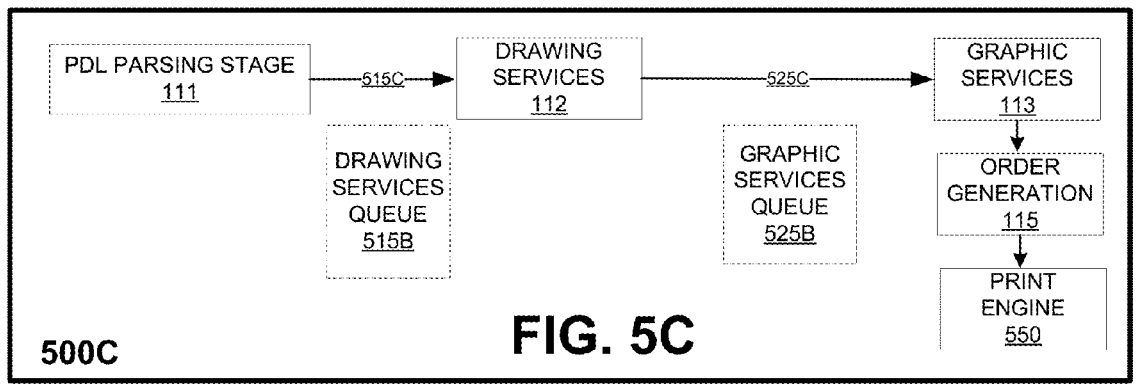

FIG. 5C displays how data can flow for a legacy PDL, such as PDL 406, in a multicore processor that supports parallel processing of a common PDL, as displayed in FIG. 5B. In FIG. 5C, PDL processing of the legacy PDL 406 includes completion of the PDL processing stages in an order similar to FIG. 5A. In particular, the legacy PDL 406 is first parsed during stage 111. Next, PDL processing continues to drawing services stage 112, followed by graphic services stage 113. Because the legacy PDL 406 is executed serially, parsing stage 111 generates synchronous requests for PDL 406. As a result, the synchronous requests bypass drawing services queue 515B (see step 515C) and proceed directly to drawing services stage 112. Similarly, requests that are generated for graphic services stage 113 bypass graphic services queue 525B (see step 525C) and proceed directly to graphic services stage 113. Order generation 115 may then follow stage 113. However, in some embodiments, order generation 115 may be part of stage 113. Once PDL processing stage 115 is finished, order lists from order generation 115 are then sent to print engine 550.

Figure 5D:
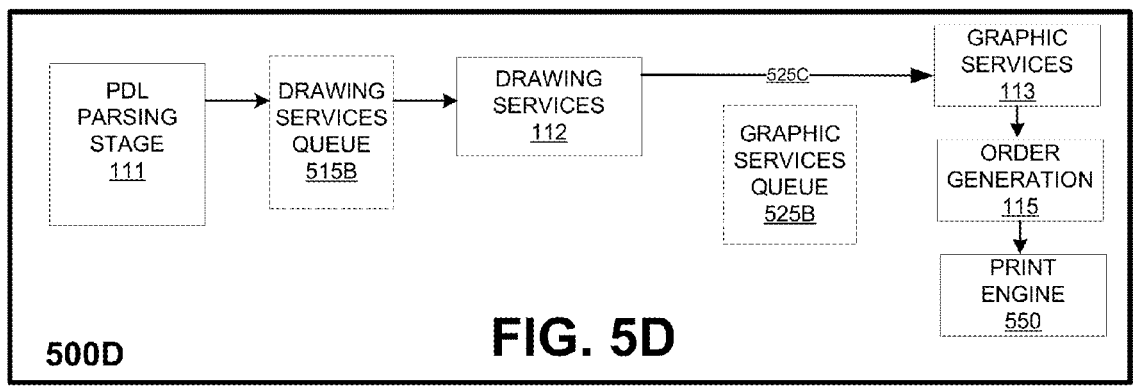

FIG. 5D displays the data flow 500D for a common PDL, such as PDL 405. The data flow 500D for the common PDL 405 makes use of both asynchronous requests for drawing services stage 112 and synchronous requests for graphic services stage 113. During the parsing stage 111, one or more asynchronous requests are generated for common PDL 405. The asynchronous requests are added to drawing services queue 515B. When stage 112 is available, the requests are removed from queue 515B for processing at stage 112. During PDL processing of the requests for stage 112, one or more synchronous requests may be generated for graphic services stage 113. Because the generated requests are synchronous requests, the synchronous requests may bypass graphic services queue 525B (see step 525C) and proceed directly to graphic services stage 113. Order generation 115 may then follow stage 113. However, in some embodiments, order generation 115 may be part of stage 113. Once PDL processing stage 115 is finished, order lists from order generation 115 are then sent to print engine 550. In some embodiments, data flow 500D may be implemented with two threads.

FIGS. 5A-5D display an example of data flow during PDL processing. However, other scenarios are possible. For example, a common PDL 407 may proceed directly from parsing stage to generate graphic services requests that are added to graphic services queue 525B. Similarly, a legacy PDL 408 may proceed from parsing stage 111 directly to graphic services stage 113, as shown in FIG. 4. Also, a common PDL may use the printer drawing services queue for stage 112, but skip the graphic services queue and use graphic services stage 113 synchronously instead. Additionally, other types of data flow are possible.

IV. Function-Based PDL Processing

The system, such as a printing device with a multicore processor, also allows a function that is used in multiple places of the PDL to behave either as an asynchronous request or a blocking synchronous request. One or more functions may be associated with an operation of the PDL. The caller of the function determines whether the function behaves asynchronously or synchronously.

In some embodiments, the caller of the function is the PDL. In some embodiments, the caller of the function may be a particular operation of the PDL. The system can determine during the parsing stage whether the function call generated from the PDL should be an asynchronous or blocking synchronous function call. The function call may be a type of request generated by the system during parsing stage 111 for a PDL.

If the function behaves as a blocking synchronous request, then the PDL processing stages for the function are executed before parsing of another function is permitted. Alternatively, if the function is an asynchronous request, then the function can be queued for various stages after the PDL processing stages are initiated. Additionally, parsing of the subsequent function can begin prior to completion of the PDL processing stages of a current function executing as an asynchronous request. Because the caller determines whether the function operates asynchronously or synchronously, the caller has flexibility in how to implement the function.

One application where a blocking synchronous function call is useful is when a subsequent function call requires data from a current function call prior to parsing of the subsequent function call. In this situation, the subsequent function call may require completion of PDL processing of the current function prior to PDL processing of the subsequent function. As a result, PDL processing of the current and subsequent function should not be conducted in parallel. To encourage this, the current function call may be a blocking synchronous function call. In this case, the subsequent function call can receive the data of the current function call prior to PDL processing of the subsequent function call. Other useful applications are also possible.

Figure 6C:
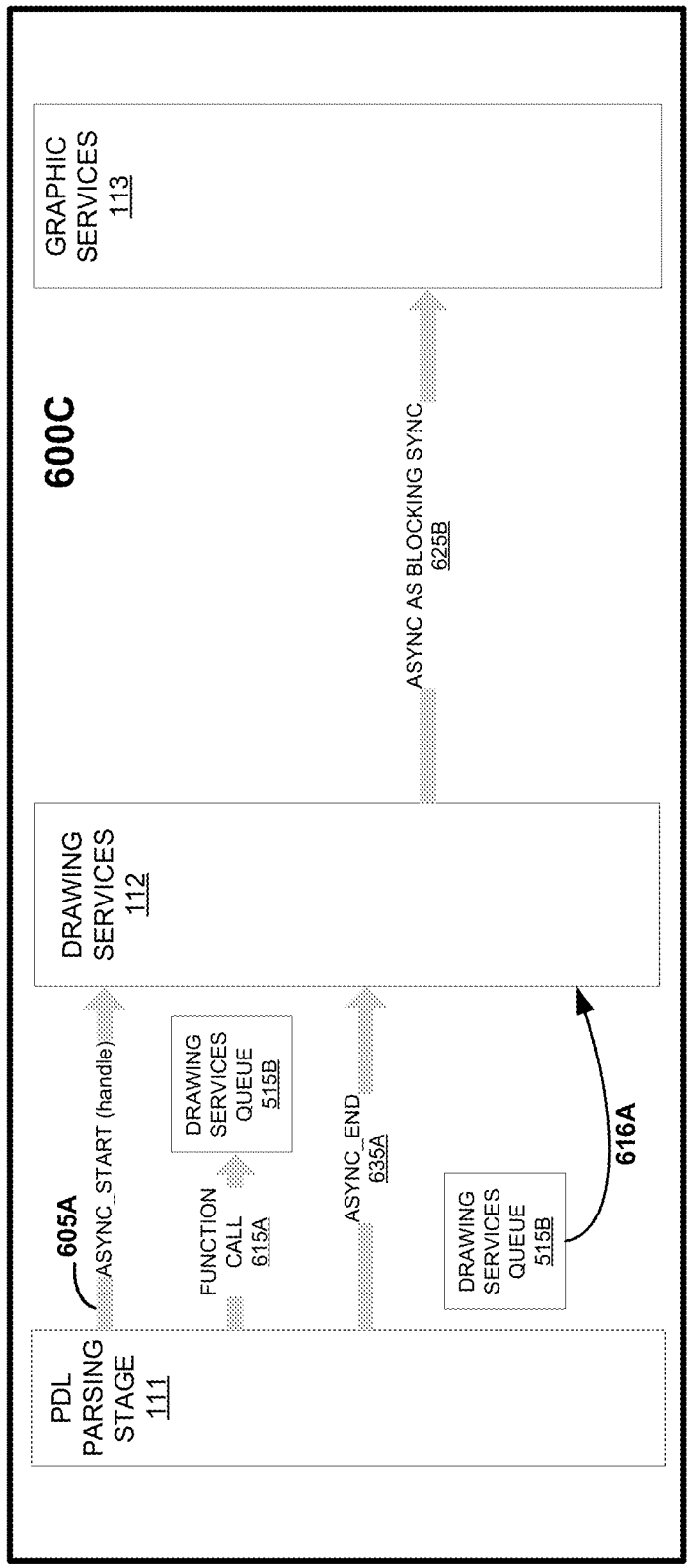

FIGS. 6A-6C display example embodiments of a function that executes as an asynchronous function call in one embodiment (FIG. 6A) and as a blocking synchronous function call in another embodiment (FIG. 6B). In both figures, a common PDL 405 is parsed during a parsing stage 111 and then proceeds to drawing services stage 112 and graphic services stage 113. In FIG. 6C, the function call relies on both asynchronous requests and blocking synchronous requests to execute.

In FIG. 6A, the caller of the function implements the function call as an asynchronous function call. The caller achieves this implementation by enclosing the function within an ASYNC_START call 605A and an ASYNC_END call 635A. By encapsulating function call 615A within calls 605A and 635A, function call 615A can be added to one or more stage queues, such as drawing services queue 515B or graphic services queue 525B. Additionally, parsing of another subsequent function can begin prior to completion of PDL processing of the current function due to the asynchronous execution of the current function.

In FIG. 6A, when the function is parsed during stage 111, asynchronous operation of a function call 615A is determined due to the encapsulation of the call 615A within calls 605A and 635A. As a result, one or more asynchronous requests, such as function call 615A, are generated during stage 111 and added to drawing services queue 515B. Once the drawing services stage 112 is available, the requests are removed from drawing services queue 515B and processed during drawing services stage 112 (see 616A).

During drawing services stage 112, one or more asynchronous requests for graphic services 113 (such as function call 625A) are generated and added to graphic services queue 525B. The requests are removed from graphic services queue 525B (see 626A) after stage 112 is complete and when graphic services stage 113 is available for processing (i.e., another function or a portion of PDL code has not currently entered graphic services stage 113 during PDL processing). Stage 113 may also include order generation 115. Thus, stage 113 may be finished for the requests from queue 525B once order generation 115 is complete.

In FIG. 6B, a caller of the function implements the function call as a blocking synchronous function call. As a result, when the function is parsed during stage 111, the stage 111 generates a blocking synchronous request 615B for drawing services stage 112. During stage 112, one or more blocking synchronous requests 625B are generated for graphic services stage 113. Stage 113 may also include order generation 115. As a result, none of the requests generated in FIG. 6B are added to a queue for a PDL processing stage, such as queue 515B or queue 525B. Additionally, parsing of a subsequent function cannot begin until the PDL processing stages (e.g., stages 111, 112, 113) are complete for the current function. Thus, the system provides flexibility in implementing functions by allowing the caller of the function to determine whether or not to call the function synchronously or asynchronously.

In FIG. 6C, the caller of the function implements the function call as an asynchronous function call by enclosing the function within an ASYNC_START call 605A and an ASYNC_END call 635A. As a result, the function call 615A can be added to drawing services queue 515B. Additionally, parsing of another subsequent function can begin during drawing services stage 112 of the current function.

In FIG. 6C, when the function is parsed during stage 111, asynchronous operation of a function call 615A is determined due to the encapsulation of the call 615A within calls 605A and 635A. As a result, one or more asynchronous requests, such as function call 615A, are generated during stage 111 and added to drawing services queue 515B. Once the drawing services stage 112 is available, the requests are removed from drawing services queue 515B and processed during drawing services stage 112 (see 616A).

During stage 112, one or more blocking synchronous requests 625B are generated for stage 113. Stage 113 may also include order generation 115. As a result, none of the requests generated for stage 113 are added to a queue, such as graphic services queue 525B from FIG. 6A. Additionally, parsing of the subsequent function cannot begin during stage 113 due to the synchronous requests. Further, the embodiment of FIG. 6C may be implemented by using two threads. Thus, the system provides flexibility for implementing different parts of the function by allowing the caller of the function to determine which parts of the function to call synchronously or asynchronously.

Although FIGS. 6A-6C display an embodiment for executing a function synchronously or asynchronously, other embodiments are possible. For example, for a different PDL, such as common PDL 407, functions for common PDL 407 may be executed synchronously or asynchronously without generating requests for drawing services stage 112. Furthermore, other functions could execute synchronously or asynchronously in a manner different than the manner shown in FIGS. 6A-6C.

V. Compound Asynchronous Operations

The system can also provide compound asynchronous operation of asynchronous requests generated during PDL processing on a multicore processor. A compound asynchronous request is multiple asynchronous requests that are generated and combined to be considered as a single request. In particular, a compound asynchronous request is treated like a single asynchronous request.

Figure 7:
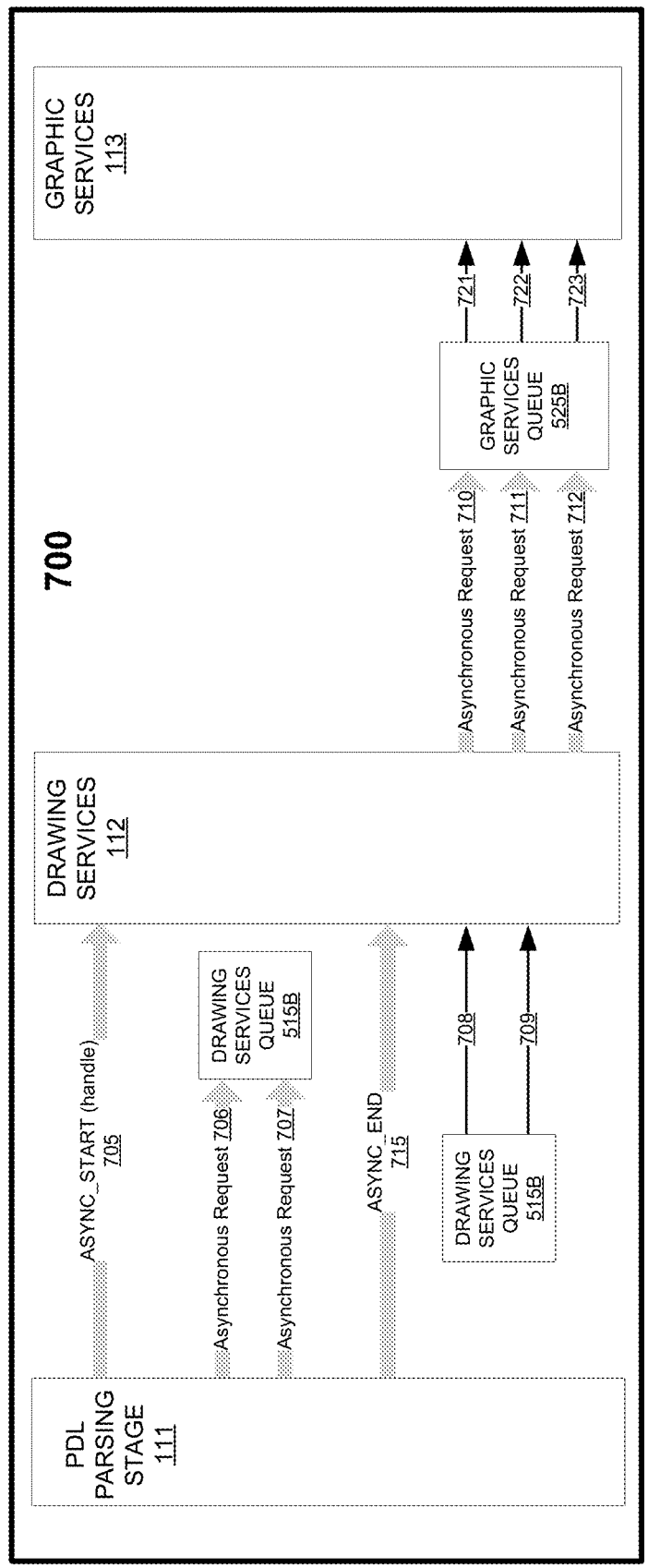
FIG. 7 illustrates an example block diagram of processing a PDL compound asynchronous request.

FIG. 7 displays an example of a compound asynchronous request 700. During the parsing stage 111, the compound asynchronous request 700 generates multiple asynchronous requests 706 and 707 that are encapsulated within calls 705 and 715. In some embodiments, calls 705 and 715 may be the same as calls 605A and 635A in FIG. 6A. In FIG. 7, the calls 705 and 715 allow asynchronous requests that are enclosed within the calls 705 and 715 to be considered as one compound asynchronous request, in this case, compound asynchronous request 700.

The asynchronous requests 706 and 707 for drawing services stage 112 are added to drawing services queue 515B. When drawing services stage 112 is available, the asynchronous requests 706 and 707 are removed from drawing services queue 515B (see 708 and 709) for processing at drawing services stage 112. During stage 112, asynchronous request 706 may cause multiple asynchronous requests 710 and 711 for graphic services stage 113 to be generated. Additionally, during stage 112, asynchronous request 707 may cause another asynchronous request 712 for graphic services stage 113 to also be generated.

During or after drawing services stage 112, the asynchronous requests 710, 711, and 712 for graphic services stage 113 may be added to graphic services queue 525B. The requests 710, 711, and 712, in addition to requests 706 and 707, are all considered as part of the compound asynchronous request 700. When graphic services stage 113 is available, the requests 710, 711, and 712 stored at graphic services queue 525B are then removed (see 721, 722, and 723) for processing at stage 113. Stage 113 may also include order generation 115. Thus, stage 113 may be finished once order generation 115 is complete. PDL processing of the compound asynchronous request may be complete once order lists are generated from order generation 115 for compound asynchronous request 700.

While FIG. 7 displays one embodiment of a compound asynchronous request, other embodiments of the compound asynchronous request exist. In some embodiments, the compound asynchronous request may use more, fewer, or different stages than those displayed in FIG. 7. In some embodiments, a compound asynchronous request may generate more or fewer asynchronous requests for more, fewer, and/or different PDL processing stages than what was displayed and discussed in FIG. 7. Further, other embodiments of compound asynchronous requests are possible.

VI. Error Handling

In a cascading asynchronous environment, many services can be used asynchronously by a single operation at different stages. For example, in FIG. 7, the compound asynchronous request 700 generates asynchronous requests for drawing services stage 112 and asynchronous requests for graphic services stage 113. Additionally, compound asynchronous request 700 is processed during other stages, such as parsing stage 111 and order generation 115. One way to provide better accuracy in a cascading environment is to propagate errors generated at different stages back to the originator of the requests. In some embodiments, the originator of the request is the PDL.

Figure 8:
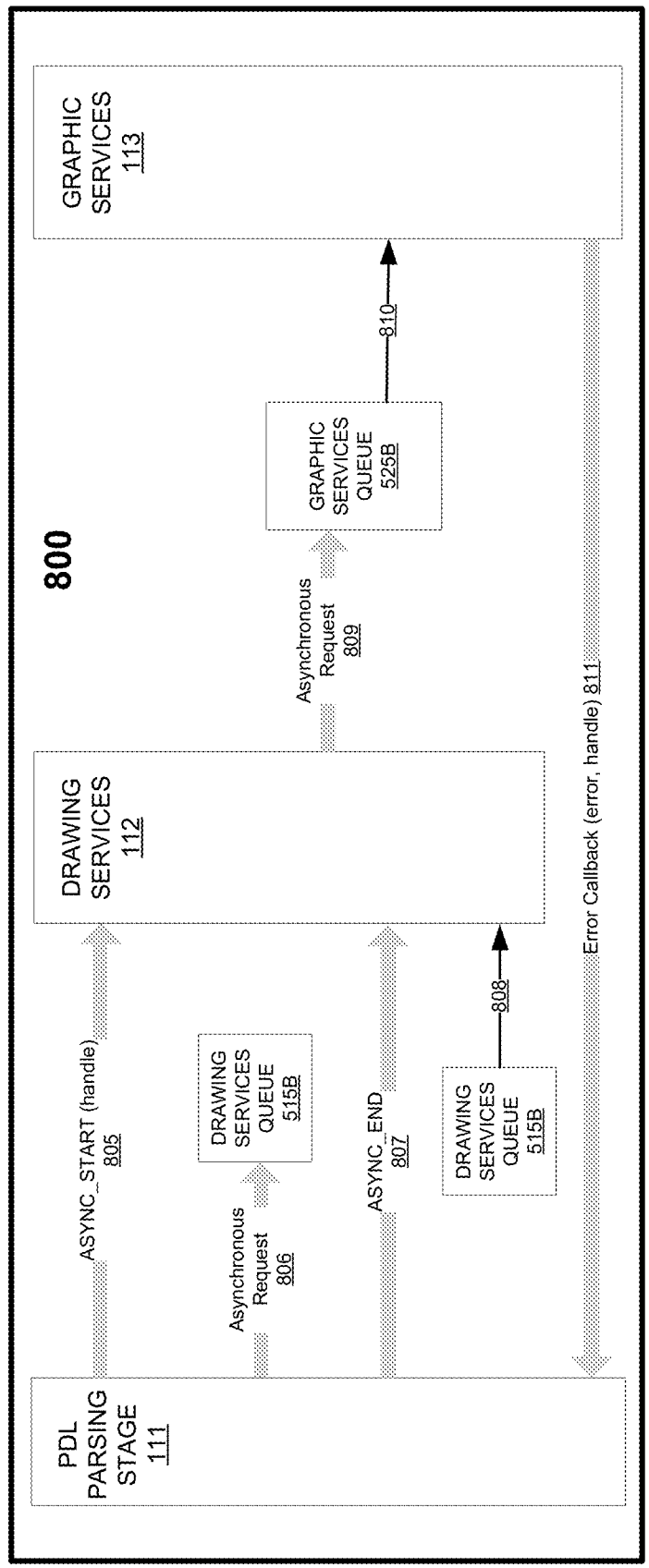
FIG. 8 illustrates an example block diagram of PDL error handling.

In FIG. 8, a portion of a common PDL 405 is parsed during parsing stage 111. During stage 111, an asynchronous request 806 for drawing services stage 112 is generated and enclosed within calls 805 and 807. The asynchronous request 806 is added to drawing services queue 515B and removed from queue 515B (see 808) when drawing services stage 112 is available. During or after drawing services stage 112, an asynchronous request 809 for graphic services stage 113 is generated by stage 112 and added to graphic services queue 525B. When stage 113 is available, the asynchronous request 809 is removed from queue 525B (see 810) and processed during stage 113.

In FIG. 8, an error may occur with request 809 during graphic services stage 113. In the displayed embodiment, error callback 811 is propagated back from graphic services stage 113 to the originator of asynchronous request 809, which may be PDL 405. In the displayed embodiment, callback 811 includes the error and a handle. The error may indicate the type of error that occurred and led to callback 811 being sent. Example errors that may cause callback 811 include an out of memory error, a job cancelled error, or other errors. The handle is a parameter that may indicate the originator of the asynchronous request, which may be the PDL 405, and/or a particular operation of the PDL 405.

In some embodiments, the handle (and/or the originator of the asynchronous request) is propagated forward with each asynchronous request. For example, asynchronous requests 806 and 809 may each include a handle to indicate the originator of the asynchronous request. In some embodiments, the handle is used for error handling, as shown in FIG. 8, whereas in other embodiments, the handle may be used for other purposes.

When the error handling method is combined with a compound asynchronous request, an error from any asynchronous request that is part of a compound asynchronous request will result in a notification (e.g., error callback 811) to the same base operation of the PDL from which the compound asynchronous request originated. As a result, the combination of the error handling of FIG. 8 and compound asynchronous operations of FIG. 7 provide an abstraction layer at the PDL stage that hides the internal details of errors. For example, if an error occurs, the error will show up for the PDL (e.g., XPS, PostScript, PCL5, PCLXL, or some other PDL) without revealing the details of what stage the error occurred at (parsing stage 111, drawing services stage 112, graphic services stage 113, or some other PDL processing stage).

While FIG. 8 displays an embodiment of error handling for parallel processing of a PDL on a multicore processor, other embodiments of error handling on a multicore processor are possible. For example, common PDL 407 may generate an asynchronous request directly for graphic services stage 113 (see FIG. 4) and still have an error callback propagate back to the originator of the asynchronous request, which may be PDL 407. Additionally, other embodiments of error handling for parallel processing of a PDL in the multicore processor environment are possible.

VII. Example Methods

Figure 9:
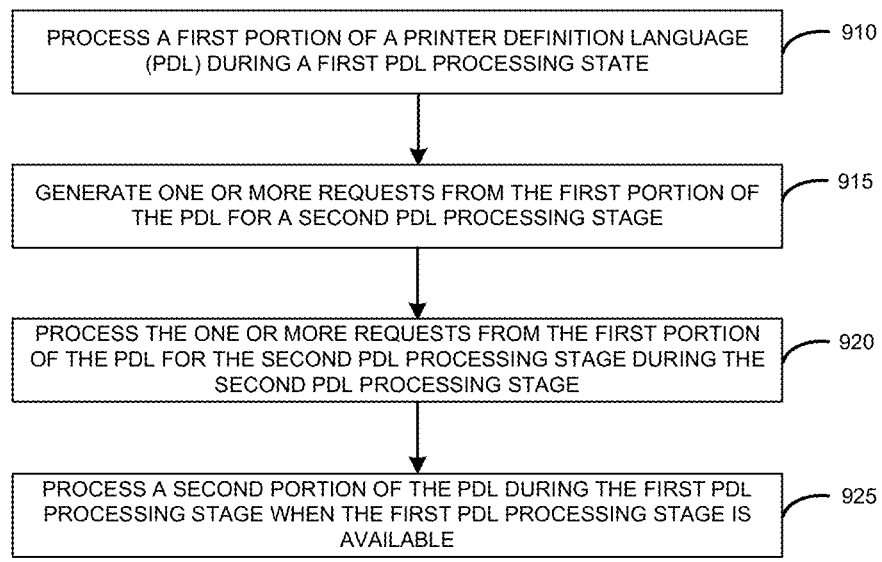
FIG. 9 is a flow chart depicting the steps of an example PDL processing method.

FIG. 9 is a flow chart illustrating an example method 900 for processing a PDL on a multicore processor. Method 900 begins with processing a first portion of a PDL during the first PDL processing stage, as shown by block 910. With reference to FIG. 5B, the first portion of the PDL may be processed during the parsing stage 111, which may be the first PDL processing stage. After processing the first portion of the PDL, the method 900 progresses to generate one or more requests from the first portion of the PDL for the second PDL processing stage, as shown by block 915. For example, with reference to FIG. 7, request 706 and 707 are generated for the drawing services stage 112, which may be the second PDL processing stage.

After generating the requests, method 900 continues by processing the one or more requests from the first portion of the PDL for the second PDL processing stage during the second PDL processing stage, as shown by block 920. For example, with reference to FIG. 7, requests 706 and 707 are processed during drawing services stage 112 after the requests are removed from drawing services queue 515B (see 708 and 709).

The method 900 then continues by processing a second portion of the PDL during the first PDL processing stage when the first PDL processing stage is available, as shown by block 925. For example, with reference to FIG. 7, while requests 706 and 707 are processed during drawing services stage 112, another portion of the PDL could be parsed during parsing stage 111. For another example, FIG. 2C shows a processor core 205 executing the thread 211B to process a first portion of the PDL 211 during the second PDL processing stage "B." FIG. 2C also shows that at the same time, processor core 204 executes the thread 212A to process a second portion of the PDL 212 during a first PDL processing stage "A."

Although FIG. 9 displays several steps for method 900, in some embodiments, method 900 may include more, fewer, and/or different steps than those displayed in FIG. 9. For example, method 900 could include steps to add the one or more requests from the first portion of the PDL for the second PDL processing stage to a second PDL processing stage queue, as shown in FIG. 7 with respect to queue 515B and requests 706 and 707. Additionally, the method 900 could include removing at least a portion of the one or more requests from the first portion of the PDL for the second PDL processing stage from the second PDL processing stage queue when the second PDL processing stage is available, as shown in FIG. 7 by 708 and 709. Further, the steps in FIG. 9 may be performed in a different order than the order shown in FIG. 9. In some embodiments, the method 900 is executed by a multicore processor of a printing device. However, in other embodiments, different hardware could execute the method 900.

Figure 10:
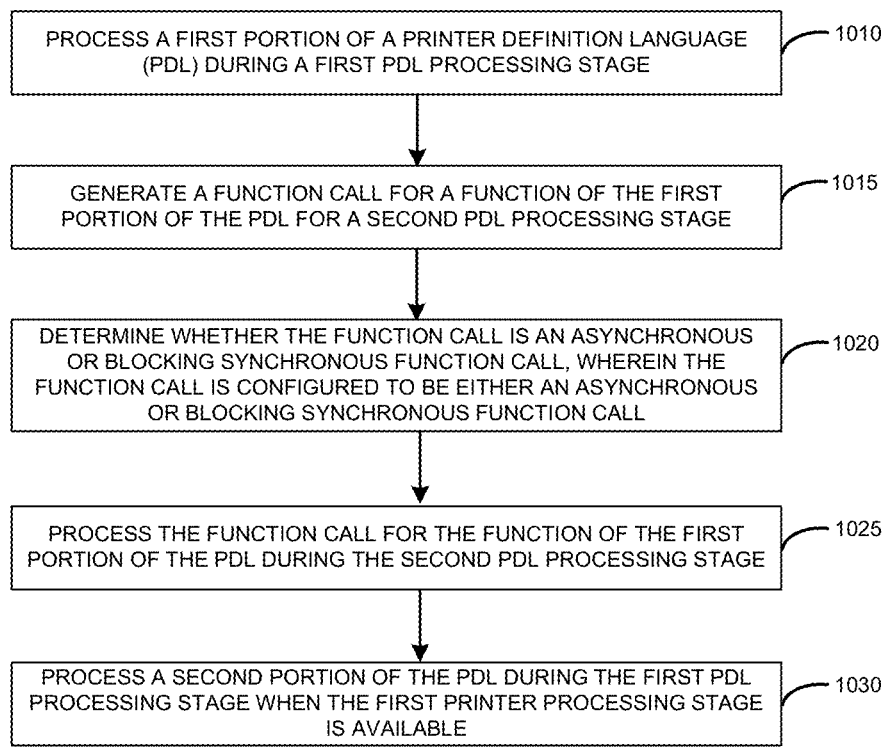
FIG. 10 is a flow chart depicting the steps of an example PDL processing method.

FIG. 10 is a flow chart illustrating an example method 1000 for processing a PDL on a multicore processor with function calls that may be executed synchronously or asynchronously. Method 1000 begins with processing a first portion of a PDL during the first PDL processing stage, as shown by block 1010. With reference to FIG. 6A, the first portion of the PDL may be processed during the parsing stage 111, which may be the first PDL processing stage. After processing the first portion of the PDL, the method 1000 progresses to generate a function call for a function of the first portion of the PDL for the second PDL processing stage, as shown by block 1015. For example, with reference to FIG. 6A, function call 615A is generated for the drawing services stage 112, which may be the second PDL processing stage.

After generating the function call, method 1000 continues by determining whether the function call is an asynchronous or blocking synchronous function call, wherein the function call is configured to be either an asynchronous or blocking synchronous function call, as shown by block 1020. For example, in FIG. 6A, the function call 615A is determined to be an asynchronous function call, whereas in FIG. 6B, the function call 615B is determined to be a blocking synchronous function call.

Next, the method 1000 continues by processing the function call for the function of the first portion of the PDL for the second PDL processing stage during the second PDL processing stage, as shown by block 1025. For example, with reference to FIG. 6A, function call 615A is processed during drawing services stage 112 after the function call 615A is removed from drawing services queue 515B (see 616A).

The method 1000 then continues by processing a second portion of the PDL during the first PDL processing stage when the first PDL processing stage is available, as shown by block 1030. For example, with reference to FIG. 6A, while function call 615A is processed during drawing services stage 112, another portion of the PDL could be parsed during parsing stage 111. For another example, FIG. 2C shows a processor core 205 executing the thread 211B to process a first portion of the PDL 211 during the second PDL processing stage "B." FIG. 2C also shows that at the same time, processor core 204 executes the thread 212A to process a second portion of the PDL 212 during a first PDL processing stage "A."

Although FIG. 10 displays several steps for method 1000, in some embodiments, method 1000 may include more, fewer, and/or different steps than those displayed in FIG. 10. For example, method 1000 could include steps to add the function call for the function of the first portion of the PDL for the second PDL processing stage to a second PDL processing stage queue, as shown in FIG. 6A with respect to queue 515B and function call 615A. Additionally, the method 1000 could include removing the function call for the function of the first portion of the PDL for the second PDL processing stage from the second PDL processing stage queue when the second PDL processing stage is available, as shown in FIG. 6A by 616A. Further, the steps in FIG. 10 may be performed in a different order than the order shown in FIG. 10. In some embodiments, the method 1000 is executed by a multicore processor of a printing device. However, in other embodiments, different hardware could execute the method 1000.

Figure 11:
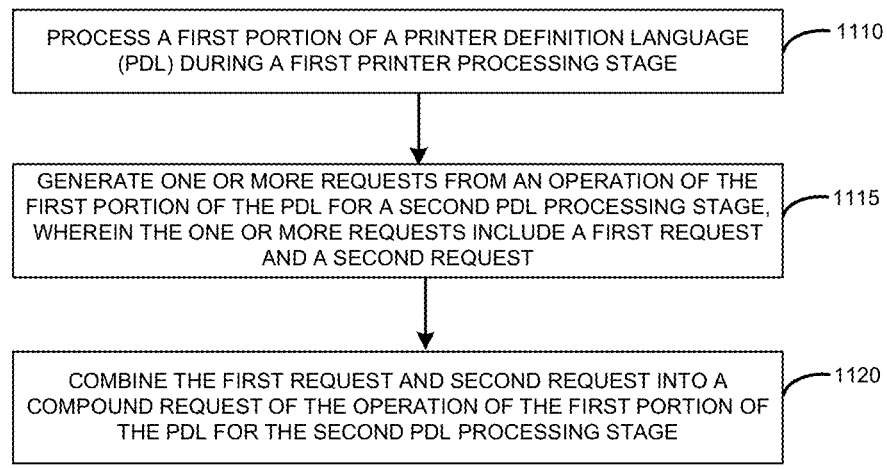
FIG. 11 is a flow chart depicting the steps of an example PDL processing method.

FIG. 11 is a flow chart illustrating an example method 1100 for processing a PDL on a multicore processor with compound asynchronous requests. Method 1100 begins with processing a first portion of a PDL during the first PDL processing stage, as shown by block 1110. With reference to FIG. 7, the first portion of the PDL may be processed during the parsing stage 111, which may be the first PDL processing stage. After processing the first portion of the PDL, the method 1100 progresses to generate one or more requests from an operation of the first portion of the PDL for the second PDL processing stage, wherein the one or more requests include a first request and a second request, as shown by block 1115. For example, with reference to FIG. 7, asynchronous requests 706 and 707 are generated for the drawing services stage 112, which may be the second PDL processing stage.

After generating the requests, method 1100 continues by combining the first request and second request into a compound request of the operation of the first portion of the PDL for the second PDL processing stage, as shown by block 1120. For example, in FIG. 7, the asynchronous requests 706 and 707 for drawing services stage 112 are considered a compound asynchronous request of an operation for a PDL.

Although FIG. 11 displays several steps for method 1100, in some embodiments, method 1100 may include more, fewer, and/or different steps than those displayed in FIG. 11. For example, method 1100 could include steps to determine, for a selected request from the compound request, that an error has occurred, wherein each request includes an identifier of an original caller of the request; determine the original caller of the selected request; and notify the original caller of the selected request about the error. For example, in FIGS. 7 and 8, if an error occurred with one of the requests of the compound asynchronous request, such as request 706, then error callback 811 may notify the original caller of request 706, which may be PDL 405. Also, the steps in FIG. 11 may be performed in a different order than the order shown in FIG. 11. In some embodiments, the method 1100 is executed by a multicore processor of a printing device. However, in other embodiments, different hardware could execute the method 1100.

VIII. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent from the foregoing descriptions. Such modifications and variations are intended to fall within the scope of the appended claims.

With respect to any or all of the ladder diagrams, scenarios, and flow charts in the figures and as discussed herein, each block and/or communication may represent a processing of information and/or a transmission of information in accordance with example embodiments. Alternative embodiments may be included within the scope of such example embodiments. Further, more or fewer blocks and/or functions may be used with any of the ladder diagrams, scenarios, and flow charts discussed herein, and these ladder diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, and/or a tangible storage device.

Additionally, any enumeration of elements, blocks, or steps in this specification, the drawings, or the claims is for purposes of clarity. Thus, such enumeration should not be interpreted to require or imply that these elements, blocks, or steps adhere to a particular arrangement or are carried out in a particular order.

It should be understood that arrangements described herein are for purposes of example only. As such, those skilled in the art will appreciate that other arrangements and other elements (e.g., machines, interfaces, functions, orders, groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting with the true scope and spirit being indicated by the following claims.

The invention claimed is:

1. A method comprising:
processing, at a first processing core of a multicore processor of a printing device, a first portion of a printer definition language (PDL) during a first PDL processing stage, wherein the first PDL processing stage comprises a parsing stage;
generating, at the first processing core, a printer drawing services function call for a function of the first portion of the PDL for a second PDL processing stage, wherein the second PDL processing stage comprises a printer drawing services stage;
determining whether the printer drawing services function call can execute concurrently with the parsing stage, wherein the printer drawing services function call is configured to be either a concurrent or non-concurrent function call;
processing, at a second processing core of the multicore processor, the printer drawing services function call for the function of the first portion of the PDL during the second PDL processing stage;
processing, at the first processing core, a second portion of the PDL during the first PDL processing stage when the first PDL processing stage is available;
when the printer drawing services function call executes concurrently with the parsing stage,
processing the second portion of the PDL during the first PDL processing stage after the first PDL processing stage of the first portion of the PDL is complete;
adding the printer drawing services function call, at the first processing core, for the function of the first portion of the PDL for the second PDL processing stage to a dedicated second PDL processing stage queue of the printing device;
removing the printer drawing services function call, at the second processing core, for the function of the first portion of the PDL for the second PDL processing stage from the dedicated second PDL processing stage queue; and
controlling the printing device based on the processed portions of the PDL.

2. The method of claim 1 further comprising:
when the printer drawing services function call is a non-concurrent function call,
processing the second portion of the PDL, at the first processing core, during the first PDL processing stage after at least the first and second PDL processing stages of the first portion of the PDL are complete.

3. A method comprising:
processing, at a first processing core of a multicore processor of a printing device, a first portion of a printer definition language (PDL) during a first PDL processing stage, wherein the first PDL processing stage comprises a parsing stage;

generating, at the first processing core, one or more printer drawing services requests from an operation of the first portion of the PDL for a second PDL processing stage, wherein the one or more printer drawing services requests include a first printer drawing services request and a second printer drawing services request;

combining, at the first processing core, the first printer drawing services request and second printer drawing services request into a compound request of the operation of the first portion of the PDL for the second PDL processing stage;

processing the one or more printer drawing services requests from the operation of the first portion of the PDL for the second PDL processing stage during the second PDL processing stage;

processing a second portion of the PDL during the first PDL processing stage when the first PDL processing stage is available;

adding the one or more printer drawing services requests from the operation of the first portion of the PDL for the second PDL processing stage to a dedicated second PDL processing stage queue of the printing device; and removing at least a portion of the one or more printer drawing services requests from the operation of the first portion of the PDL for the second PDL processing stage from the dedicated second PDL processing stage queue; and controlling the printing device based on the processed portions of the PDL.

4. The method of claim 3, wherein the first printer drawing services request and second printer drawing services request are concurrent requests.

5. The method of claim 4 further comprising:

generating a graphics services request, from the compound request of the operation of the first portion of the PDL for a third PDL processing stage; and adding the graphics services request to the compound request of the operation of the first portion of the PDL, wherein the compound request includes the first printer drawing services request, the second printer drawing services request, and the graphics services request.

6. The method of claim 5 further comprising:

determining, for a selected request from the compound request, that an error has occurred, at the first processing core, a second processing core, or a third processing core of the multicore processor, wherein each request includes an identifier of an original caller of the request;

determining the original caller of the selected request; and notifying the original caller of the selected request about the error.

7. The method of claim 6, wherein the original caller of the selected request is at the first processing core or the second processing core of the multicore processor.

* * * * *